UNITED STATES PATENT OFFICE.

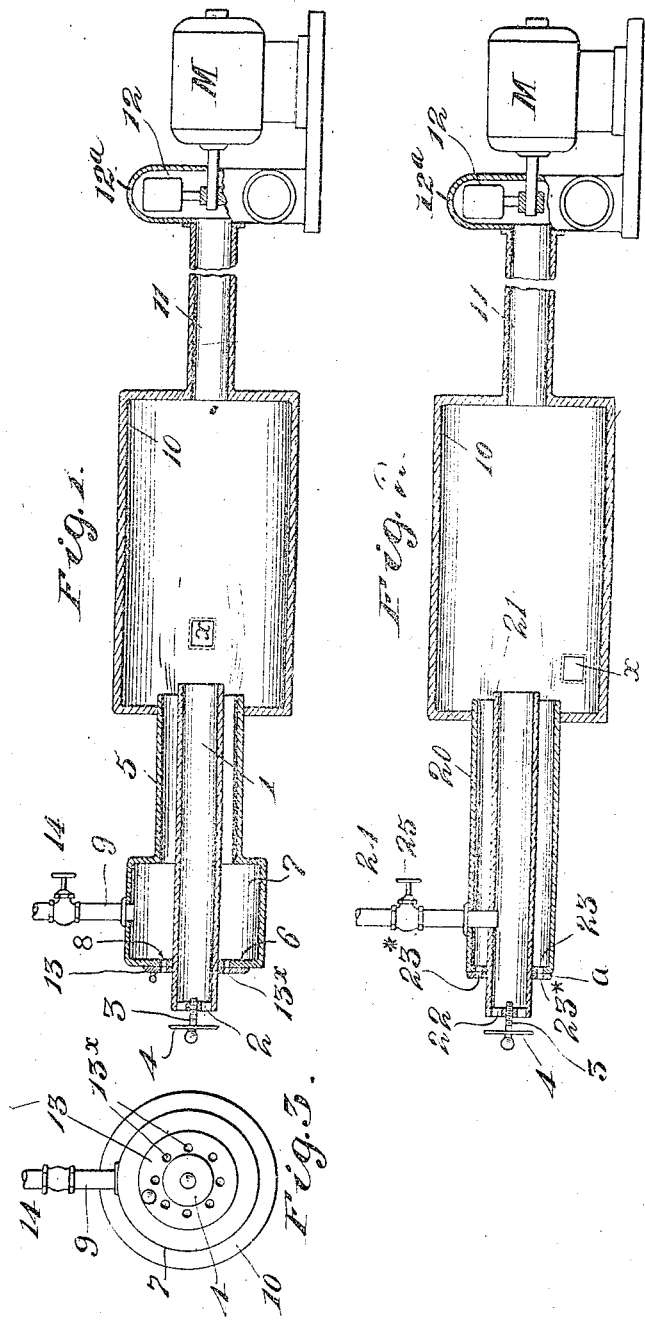

ALCORN RECTOR, OF NEW YORK, N. Y., ASSIGNOR TO RECTOR GAS LAMP COMPANY, OF NEW YORK, N. Y., A CORPORATION OF NEW YORK.

METHOD OF COMBUSTION.

1,144,782.     Specification of Letters Patent.     Patented June 29, 1915.

Application filed September 26, 1910, Serial No. 583,773. Renewed May 19, 1915. Serial No. 29,224.

*To all whom it may concern:*

Be it known that I, ALCORN RECTOR, citizen of the United States, residing at New York city, in the county and State of New York, temporarily residing in the city of Pittsburgh, in the county of Allegheny and State of Pennsylvania, have invented certain new and useful Improvements in Methods of Combustion, of which the following is a specification, reference being had therein to the accompanying drawings.

This invention relates to a method of combustion of any gas or other fuel, its object being to secure improved combustion with the production of a maximum of heat.

In burning natural combustible gas, which, because of its high hydrogen content, requires more air than artificial gas to effect combustion, tall and expensive chimneys are required, involving plant accessories that are constructed, operated and maintained at great expense, and which are so inefficient that large quantities of carbonaceous material issue as waste from the chimneys, to the detriment of health or convenience and to the injury of buildings, etc.

While my invention is of particular applicability in removing the objections noted in connection with natural gas, my method may be well employed in the burning of artificial combustible gases, as set forth in my application Serial No. 583,775, of even date herewith and filed September 26, 1910.

In the accompanying drawings, illustrating the principle of my invention and the best mode now known to me of applying that principle, Figure 1 is mainly a diagrammatic view of apparatus useful in practising my invention. This view shows one form of novel apparatus. Fig. 2 is a view similar to Fig. 1, of a somewhat different form of apparatus. Fig. 3 is an end view of what is shown in Fig. 1.

In Fig. 1, I show a novel form of air and gas supply apparatus, consisting of a central air tube 1 formed at its butt end with a cross-piece 2 that is formed with a threaded hole for reception of a threaded projection 3 of the thereto-fixed cover 4, adjustment of which serves to regulate (if any such regulation is required) the volume of air admitted to the air tube. This air tube is inclosed by a tube 5 of larger diameter and provided with an end wall 6, through a central hole in which the air tube is passed and there fixed. An annular mixing chamber 7 is thereby formed around the air tube, the two tubes being preferably concentric. An end wall 6 is perforated at 8 for admission of atmospheric air into mixing chamber 7, wherein it is mixed with any combutible fuel (natural or artificial) that is supplied to chamber 7 through gas-pipe 9 which communicates with chamber 7, preferably near the butt end thereof, so as to secure as thorough mixing as possible of the gas and air before such mixture reaches the fire tip. A Bunsen burner having a central air passage is thus obtained. The tip portion of the described apparatus communicates with the chamber of a casing 10 that is intended to represent any kind of structure,—heater, stove, radiator, furnace, etc. The chamber is also connected preferably by a pipe 11 with a casing 12 inclosing a vacuum producing and maintaining device operable in any suitable manner (first) to create and maintain a substantial vacuum within the closed apparatus (second) to draw air in at the butt end of the air tube simultaneously with the mixing of the rarefied air and gas in the mixing chamber 7; (third) to compel a central air draft to travel at high speed through, but out of contact with, the mixture until the central air body and gaseous or other combustible mixture intermingle to a certain extent at the tip of the supply apparatus; (fourth) to accelerate and intensify combustion of the mixture when it is ignited at the tip of the outer tube; and (fifth) to carry off the products of combustion from within the casing and to remove them from the immediate vicinity of the flame rapidly and efficiently, and to prevent a possible change of back draft which impairs or destroys the complete combustion. Because of the central swiftly moving or properly high-speed air-draft, very perfect combustion is obtained.

If desired, the air inlets 8 may be closed by the damper 13, having perforations 13ˣ, so as to cut off access of air to mixing chamber 7, in which event unmixed gas from pipe 9 may flow into chamber 7 and thence to the tip of the outer tube for mixture with air obtained thereat, and for ignition and combustion. Of course damper 13 and cover 4 may be each adjusted to regulate and vary the admission of air to the chamber that they respectively control. Pipe 9 is shown with a regulating valve 14.

M indicates a motor for driving the fan.

This apparatus is peculiarly advantageous in burning natural gas in that it is readily regulated to vary the volume and relative quantities of air admitted to the tubes; and in using this apparatus the annular flame obtained on ignition of the gas at the tip of the outer tube is interiorly exposed to a high-speed air current or central draft, the speed depending on the completeness of the vacuum.

In Fig. 2, the supply apparatus is so constructed as to reverse the relative location of the power-controlled air draft and the volume of combustible gas. In this form, the volume of combustible gas is conducted in what may be called rod form, considered as a physical object, while the unmixed air is conducted in tubular form, exteriorly of the central gas volume. In this form of construction the air tube is indicated by 20, the interior gas tube by 21 and the air inlet of the Bunsen burner by 22. The damper-controlled perforations in the end wall 6 of the air tube are indicated by 23, the gas supply pipe of the Bunsen burner tube by 24, and its cut-off valve by 25. The perforated damper for perforations 23 is indicated by $a$ and its perforations by 23*. The casing or shell indicating any form of useful construction of combustion chamber is shown with a door $x$, so that access may be had to the gas jet to light it. Any other suitable ignition device or means may, of course, be used.

My new method is applicable in various arts. It may be practised, for example, by suitably constructed furnaces for treatment of ores or metals; glass, cement, etc., and generally in all arts where great heat is required.

I do not herein claim any of the apparatus herein shown, as the same form the subject-matter of my co-pending applications Serial Nos. 583,774 and 583,776, each filed September 26, 1910.

I have shown the pipe leading to the casing which incloses the vacuum producing and maintaining device as broken away, to indicate the fact that in ordinary installations, and, generally speaking, in all manufacturing installations, the vacuum producing and maintaining device is located at a point substantially distant from the combustion chamber. As many Bunsen burners of similar construction for admission of gaseous fuel and combustion-supporting gas may communicate with the combustion chamber as the nature of the installation requires. I burn the combustible mixture in attenuated molecular condition in a partially vacuumized chamber. By the term "gaseous fuel" I include any and every kind of gasifying fuel that can be used in the practice of this method, whether mixed or unmixed with air.

The casing $12^a$ which incloses the vacuum producing and maintaining device is hermetically connected with the pipe 11 which prevents entrance of back drafts through the casing and pipe into the combustion chamber when the apparatus is in operation, and therefore then serves to maintain the partially vacuumized condition of the combustion chamber and pipe and permits the removal immediately and continuously of the products of combustion. In all of the forms of apparatus shown, the gas may be mixed with air before the mixture reaches the point of combustion or flame and is therefore in a better combustible state at the combustion point than it would be if the mixing of the air and fuel were delayed until it had reached the point of combustion.

It will be noted that the vacuum producing and maintaining device which is operable to prevent back drafts is substantially an integral part of the apparatus as a whole and that its connection is so constructed that the contents of the chamber become more rarefied and thoroughly mixed than is possible in the various forms of apparatus or in the various methods of combustion employing natural draft. Such an apparatus as herein shown is inoperable under natural draft conditions as its combustion chamber is so sealed against the atmosphere that the strong artificial suction of a vacuum producing device is required to draw in sufficient for combustion. Control of the suction makes possible control of the air supply in spite of small openings in the chamber to the atmosphere. The small openings, in turn, make possible the protection of the chamber against atmospheric invasion, that is to say against the invasion of air in large masses which dilutes the heat and impedes the mixture of the gas and air; or against the invasion of any air into the chamber beyond that actually required for combustion. This nice regulation of the air, to meet exactly the requirements of combustion is made possible by reason of the control of both the artificial suction and the air openings; therefore, there is no passing of unconsumed gas and air from the exhaust as in the various combustion appliances and methods employing natural draft. In other words, prevention of back drafts, rarefaction of the mixed gas and air and of the air taken into the apparatus, rarefaction of the combustible mixture at the place of combustion, rarefaction of the products of combustion while they remain in the apparatus, the provision for exclusion of all air not required for mere purposes of combustion and the creation and maintenance of a substantial vacuum throughout the entire inclosure are material points of the present invention, and by this invention are brought for the first time into such a unitary and practical form, that approximately perfect combustion is obtainable without the use of high chimneys and with the minimum loss of heat units.

What I claim is:—

1. A method of combustion consisting in artificially creating a partial vacuum at the place of combustion, delivering a volume of gas in a highly rarefied state to the place of combustion, maintaining a volume of air also in a highly rarefied state, inclosing one volume within and out of contact with the other, drawing them to a point of combustion, and burning the same in a partial vacuum substantially sealed against excessive atmospheric invasion.

2. A method of combustion consisting in maintaining an inclosed volume of gaseous fuel mixed with air in a highly rarefied state, separately maintaining a volume of air also in a highly rarefied state, conducting the gas and air to a place of union for combustion, and burning said mixture in a partial vacuum substantially sealed against excessive atmospheric invasion.

3. A method of combustion consisting in artificially creating and maintaining a partial vacuum, delivering a volume of gas and a volume of air, one interiorly of but out of contact with the other, into the vacuumized space toward and to the point of union for mixture and ignition in the vacuumized space, and forcibly withdrawing the products of combustion through and out of said vacuumized space, thereby insuring against back draft.

4. A method of combustion consisting in artificially creating and maintaining a partial vacuum, conducting simultaneously a volume of gas and a volume of air to a place of union for mixture in the vacuumized space, mixing the same and burning the mixture thereat substantially sealed against atmospheric invasion, and forcibly withdrawing the products of combustion out of said vacuumized space.

5. A method of combustion consisting in artificially creating and maintaining a partial vacuum at the place of combustion, conducting gas and air thereto, mixing and burning the same thereat substantially sealed against atmospheric invasion, and forcibly withdrawing therefrom the products of combustion.

6. A method of combustion consisting in supplying gas to a place of combustion, supplying air thereto by artificial suction, mixing and burning the gas and air thereat under artificial suction and by the said suction withdrawing the combustion products therefrom.

7. A method of combustion consisting in artificially controlling the suction at the place of combustion, supplying gas and air thereto, mixing and burning the same thereat under artificial suction and by the said suction withdrawing the combustion products therefrom.

In testimony whereof I have affixed my signature in presence of two witnesses.

ALCORN RECTOR.

Witnesses:
 WALTER YATES,
 CHAS. F. RANDOLPH.